United States Patent [19]
Chun

[11] Patent Number: 5,949,916
[45] Date of Patent: Sep. 7, 1999

[54] MODIFIED AUTOMATIC REGRESSIVE FILTER AND FILTERING METHOD THEREFOR

[75] Inventor: In-seo Chun, Suwon, Rep. of Korea

[73] Assignee: SamSung Electronics Co., Ltd., Kyungki-do, Rep. of Korea

[21] Appl. No.: 08/880,674

[22] Filed: Jun. 23, 1997

[51] Int. Cl.$^6$ ............................... G06K 9/40; H04N 5/21
[52] U.S. Cl. ................... 382/261; 382/168; 382/173; 348/607
[58] Field of Search ................................. 382/107, 261, 382/265, 168, 173, 260; 348/412, 415, 607, 610; 358/463

[56] References Cited

U.S. PATENT DOCUMENTS

| | | | |
|---|---|---|---|
| 4,350,998 | 9/1982 | Verhoeven | 382/260 |
| 5,237,413 | 8/1993 | Israelsen et al. | 348/607 |
| 5,592,226 | 1/1997 | Lee et al. | 348/412 |
| 5,764,307 | 6/1998 | Ozcelik et al. | 348/607 |

*Primary Examiner*—Thomas D. Lee
*Attorney, Agent, or Firm*—Robert E. Bushnell, Esq.

[57] ABSTRACT

A filtering method and a modified automatic regressive filter therefor are provided. The modified automatic regressive filter includes: a frame memory for storing one frame of the output of the filter; a frame difference generating portion for receiving the signal stored in the frame memory and an observed signal, to output a frame difference, and determining whether the current pixel belongs to a non-moving region or a moving region to output a moving index; a histogram generator for converting the frame difference of the non-moving region into a cumulative distribution function required for calculating the variance of noise in the non-moving region of the observed signal; and a selective filter output portion for selectively outputting the observed signal unaltered in the moving region and the signal passed via an adaptive filter having the gain calculated based on the output data of the histogram generator in the nonmoving region. Thus, a continuous moving signal is processed in real-time with high noise removing capability, and the edge of the moving target is preserved without being blurred.

7 Claims, 3 Drawing Sheets

MODIFIED AUTOMATIC REGRESSIVE FILTER AND FILTERING METHOD THEREFOR

BACKGROUND OF THE INVENTION

1. Field of the Invention

The present invention relates to an automatic regressive (AR) filter and a filtering method thereof, and particularly, to an AR filter which functions as an adaptive filter in a still region of an image and outputs an observed signal unaltered in a moving region of the image in order to remove a blurring phenomenon at the edge of a moving target in that image.

2. Related Art

Generally, a filter used for removing noise of an image signal is classified as one of two: a spatial domain filter and a time domain filter. The spatial domain filter includes an average filter in which the current pixel is replaced by a average obtained by applying a weight to horizontal and vertical adjacent pixels within a window of a predetermined size which bounds an area around the current pixel. The spatial domain filter also includes a median filter, in which pixels of a window are ranked depending on the intensity of each pixel and then the proper intensity is selected as a representative value.

In an average filter, the performance of removing the Gaussian noise increases as the size of the window increases. The quality of image is reduced, however, due to a blurring phenomenon at the edge of a target display on a screen. The median filter can preserve the edge due to its strong effect on impulsive noise, however, it is inferior at removing Gaussian noise. In addition to the above filters, there is a LEE filter for varying a weight using the variance of noise in the image.

When applying the spatial domain filter to a continuous moving image, much hardware is required for getting window data in the vertical direction, and the size of the window must be increased to enhance the noise removal capability. Accordingly, it is difficult to implement a real-time process. Thus, the spatial domain filter is applied to a still image.

On the other hand, the time domain filter can be implemented recursively, unlike the spatial domain filter, and provides good noise removal using less hardware. Also, since the edge of the still target of the screen can be preserved well, the time domain filter is often used as a real-time noise removing filter for a moving picture. The time domain filter, however, also causes the blurring at the edge of the moving target as the noise removing capability thereof increases. Thus, the time domain filter is not suitable to be used in an automatic monitoring/sensing apparatus to observe a moving target.

SUMMARY OF THE INVENTION

To solve the above problems, it is an object of the present invention to provide a filtering method and an automatic regressive (AR) filter therefor in which weights to an observed signal of a time domain filter capable of performing a real-time process are automatically selected at optimum according to a frame difference power, so that the edge of a moving target occurring on an automatic monitoring or sensing is preserved well, thus providing good picture quality.

It is another object of the present invention to provide a method for finding the variance of the noise in a moving image.

According to an aspect of the first object, there is provided a filtering method of a modified automatic regressive filter for removing a blurring phenomenon at the edge of a moving target by generating a frame difference for each successive frame, caused by the difference between an observed signal and an output signal of the filter delayed by a frame, classifying an original image signal into a moving region and a non-moving region according to whether the frame difference exists or not; and outputting the signal in the non-moving region passed via an adaptive filter and the signal in the moving region, having variations generated by the moving of the target, unaltered.

According to another aspect of the first object, there is provided a modified automatic regressive (AR) filter for removing a blurring phenomenon at the edge of a moving target using an adaptive filter utilizes a frame memory for storing one frame of the output of the filter to obtain the output of the filter delayed by a frame, a frame difference generating portion for receiving the output signal from the filter, delayed by a frame and stored in the frame memory and an observed signal, to output a frame difference obtained from the difference between the filter output signal delayed by a frame and the observed signal, and determining whether the current pixel belongs to a non-moving region or a moving region using the frame difference to output a moving index representing whether a target moves or not, a histogram generator for receiving the frame difference and the moving index of the frame difference generating portion to convert the frame difference of the non-moving region into a cumulative distribution function required for calculating the variance of noise in the non-moving region of the observed signal, wherein the number of the accumulated pixels represents the area of the non-moving region, and a selective filter output circuit for selectively outputting the observed signal unaltered in the moving region and the signal passed via an adaptive filter having the gain calculated based on the variance of the observation noise obtained from the output data of the histogram generator in the non-moving region, depending on the moving index output from the frame difference generating portion.

To achieve the second object, there is provided a method for determining the variance of noise of a moving picture by making a histogram from the frame difference between two continuous frames of a non-moving region, the frame difference being generated by the difference between an observed signal and an output signal from a filter delayed by a frame, and calculating the variance of the observation noise using the histogram.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
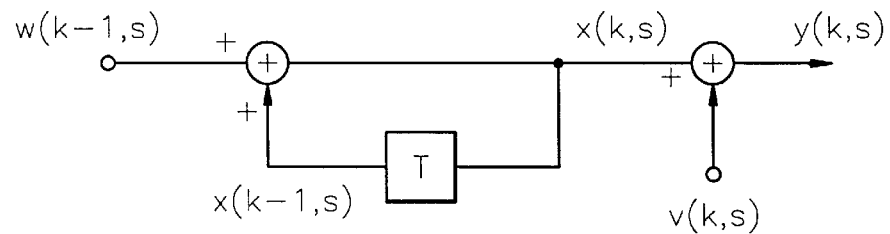
FIG. 1 is a diagram obtained based on the equations (1) and (2) for modeling a real image signal and an observed signal.

Assuming a sampling index on a continuous time axis is "k" and a two-dimensional (horizontal and vertical) location index on spatial axes is "s", after digitizing an image signal using an image sensing apparatus such as a camcorder or a thermal image camera, an intensity function of each pixel is expressed as y(k,s). Here, the intensity function y(k,s) of each pixel is an observed signal passed through an image sensor and an analog-to-digital (A/D) converter, and includes an observation noise. Assuming an original image signal of the natural world is x(k,s), a noise removing filter is for getting a signal which is closest to the signal x(k,s) from the observed signal y(k,s).

As described above, the noise removing filter includes various types. According to the present invention, there is provided a modified first-order automatic regressive (AR) filter which can perform a real-time process with respect to a continuous moving signal, remove noise and preserve the edge of a moving target in a moving picture.

Assuming an image signal is modeled on a time axis by the first-order recursive process, a dynamic equation (1) is obtained as follows.

$$x(k,s)=x(k-1,s)+w(k-1,s) \quad (1)$$

Here, a random drive w(k,s) has white Gaussian distribution with a mean of 0, since the system parameter is set to 1. On the other hand, assuming the observation parameter is 1 and the observation noise v(k,s) has white Gaussian distribution with a mean of 0, an observation model is expressed by the following equation (2).

$$y(k,s)=x(k,s)+v(k,s) \quad (2)$$

FIG., 1 is a diagram obtained from the equations (1) and (2) for modeling the real image signal and the observed signal. Assuming the output of a filter for reproducing an original image from the observed signal is x(k,s) and the filter is a first-order recursive filter having the same order as the dynamics, the modeling of the output of the filter is achieved as the following equation (3).

$$x(k,s)=b(k,s)y(k,s)+(1-b(k,s))x(k-1,s) \quad (3)$$

The optimal filter is implemented by calculating b(k,s) which minimizes the mean square error between the estimated value obtained from the equation (3) and the original image signal.

$$\frac{\partial E[x(k,s)-x(k,s)]^2}{\partial b(k,s)}=0 \quad (4)$$

$$\frac{\sigma_w^2(s)+\sigma_v^2(s)b(k-1)}{\sigma_v^2(2)+\sigma_w^2(s)+\sigma_v^2(s)b(k-1)} \quad (5)$$

From equation (4), b(k,s) is obtained as equation (5), where:

$$\sigma_w^2(s)=\frac{1}{k}\sum_{i=1}^{k-1}w^2(i,s)$$

and $$\sigma_v^2=\frac{1}{k}\sum_{i=1}^{k-1}v^2(i,s)$$

On the other hand, the random processes w(k,s) and v(k,s) are ergodic each other with respect to the continuous image signal without motion in the time and spatial axes, so that $\sigma_v^2$ and $\sigma_w^2$ of the spatial axis are calculated and then the results are substituted for the equation (5). Since the same gain is applied to one frame as described above, noise can be optimally removed from the continuous image signal without motion. In the moving region, however, the change in the original image, caused by the appearing and disappearing of parts of the target and background, becomes dulled by a filter for removing noise. In particular, the boundary of the target, which critically affects the visual perception of a human being, is blurred. Also, while $\sigma_w^2$ is set to an initial value as the variance of the original image, $\sigma_v^2$ is varied according to the intensity of the observation noise. Thus, the gain should be properly varied by checking the intensity of the observation noise per frame.

According to the present invention, in order to removing the blurring at the boundary of the target, caused by the moving of the target, a frame difference is generated per frame to divide the original image signal into a moving region and a non-moving region according to whether the frame difference exists or not. Then, the image signal existing in the non-moving region is filtered by an adaptive filter while the image signal existing in the moving region, having information generated or disappeared by the moving of the target, is passed unaltered without filtration. In the nonmoving region having a flat distribution in the brightness of the image, since even minute noise can affect seriously the image quality considering the characteristic of the visual perception, the noise is removed. On the contrary, the brightness of the original image signal sharply changes in the boundary of the moving target, a certain degree of noise does not affect the visual perception, and the blurring caused by the filter further deteriorates the image quality. Thus, preferably, the observed image is passed unaltered in the moving region.

Next, it is important to properly operate the variance of the observation noise per frame in order to implement an adaptive filter. This variance operation depends on a part of the observed signal to be determined as a variance operation region of the noise, and the change ratio of the image at a flat distribution region is calculated. However, it is impossible to check whether a continuous real-time image belongs to the flat distribution region or not. According to the present invention, assuming the frame difference of two continuous frames in the non-moving region represents amount of the observation noise, a histogram is obtained from the frame difference of the non-moving region and the variance of the observation noise is operated by the histogram.

Figure 2:
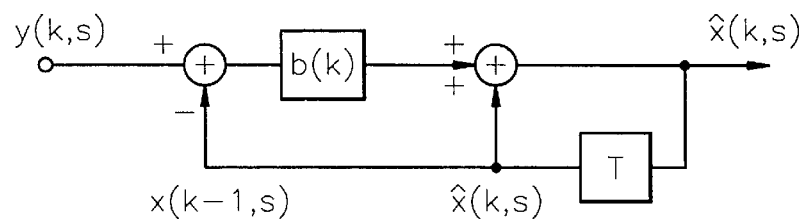
FIG. 2 is a diagram showing the structure of an adaptive filter proposed by the present invention.

On the other hand, in order to determine whether the original image signal belongs to a moving region or a nonmoving region, an isolated pixel removing method by 8 neighboring pixels is used. The above steps can be performed through a real-time process, and the detailed design of a circuit for removing the isolated pixel will be described later. FIG. 2 is a diagram showing the structure of the first-order recursive filter as an adaptive filter implemented by the present invention.

The b(k,s) of the equation (5) is expressed as follows according to whether a moving difference, that is, difference scene caused by the moving of the moving target, exists or not.

In the case of non-moving region without the moving difference, b(k,s) is expressed by equation (6).

$$b(k, s) = bm(k) = \frac{\sigma_w^2 + \sigma_v^2 bm(k-1)}{\sigma_v^2 + \sigma_w^2 + \sigma_v^2 bm(k-1)} \quad (6)$$

where $\sigma_w^2$ is a constant, and $$\sigma_v^2 = \frac{1}{2\sum_{s=1}^{N} MI(k,s)} \sum_{s=1}^{N} (\text{FrameDifference})^2 =$$

$$\frac{1}{2\sum_{s=1}^{N} MI(k,s)} \sum_{s=1}^{N} MI(k,s) \cdot [y(k,s) - x(k-1,s)]^2$$

wherein, if "s" belongs to the moving region, MI(k,s)=0, otherwise, MI(k,s)=1.

Regarding the moving region with moving difference, b(k,s) is expressed by equation (7).

$$b(k,s)=1 \quad (7)$$

Since $\sigma_v^2$ is the square of the frame difference in the non-moving region without moving, $\sigma_v^2$ is expressed as a power of the noise of the frames of (k−1) and k. The obtained value represents the noise existing over two frames, so this is divided by 2. When a filter modified by equations (6) and (7) is used, the noise is removed from the non-moving region and the observed signal is output from the moving region unaltered. That is, when compared to the rate of change of the signal, the power of noise has only a slight affect in the moving region being an edge of the moving target having a sharp slope. In order to help the visual perception of a human being, the rate of change of the signal in the moving region should be shown unaltered, so the gain is fixed at 1. Also, MI(k,s) represents a moving index, and bm(k) represents the gain of the adaptive filter at the non-moving region.

Figure 3:
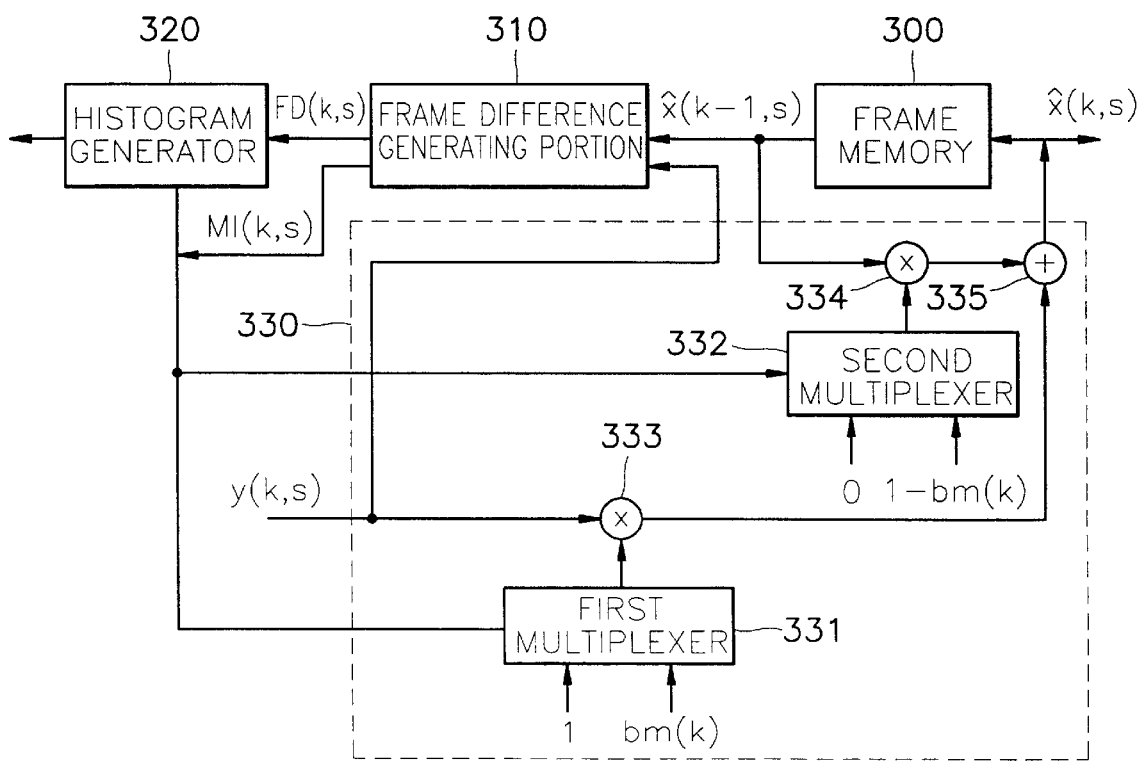
FIG. 3 is a block diagram showing the structure of a modified automatic regressive filter adopted as an adaptive filter, which does not cause blurring at a moving edge.

FIG. 3 is a block diagram showing the structure of the modified AR filter of the present invention, as an adaptive filter, which does not cause blurring at the edge of the moving target. A frame memory 300 is a block for storing one frame of output x(k,s) of the filter in order to obtain filter output signal x(k−1,s) delayed by one frame. A general video memory is used as the frame memory 300.

A frame difference generating portion 310 receives the filter output signal x̂(k−1,s) delayed by a frame, stored in frame memory 300, and the current observed signal y(k,s) to output a frame difference FD(k,s) and a moving index MI(k,s). The frame difference FD(k,s) is the difference between the delayed filter output signal x̂(k−1,s) and the observed signal y(k,s). The moving index MI(k,s), representing whether the target moves or not, is output depending on whether the current pixel belongs to the nonmoving region or the moving region based on the frame difference. Also, the moving index MI(k,s) adjusts the gain of the filter and determines whether to accumulate the frame difference FD(k,s) in a histogram generator 320.

Figure 4:
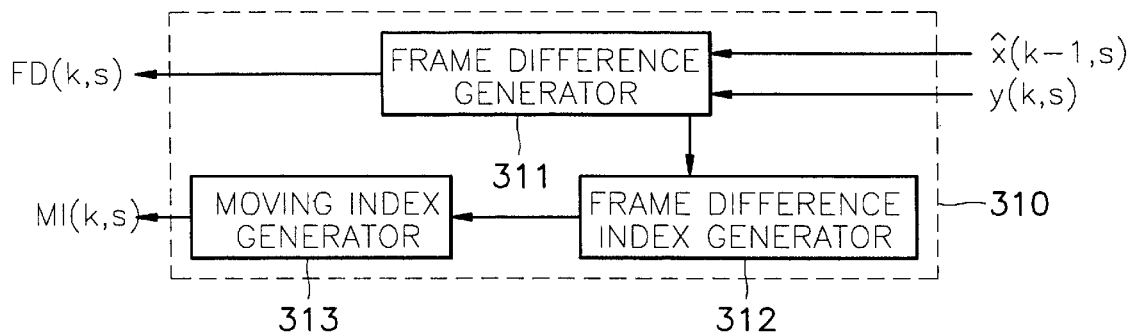
FIG. 4 is a detailed block diagram of a frame difference generating portion.

As shown in FIG. 4, the frame difference generating portion 310 includes a frame difference generator 311, a frame difference index generator 312 and a moving index generator 313. Frame difference generator 311 receives the filter output signal x̂(k−1,s) delayed by a frame, stored in frame memory 300, and the current observed signal y(k,s) to generate the frame difference FD(k,s) by calculating the difference between the delayed filter output signal and the observed signal. Frame difference index generator 312 compares the value of the frame difference obtained by frame difference generator 311 with a predetermined threshold value and generates a frame difference index of "0" or "1". That is, the frame difference index having the logical value of "0" is generated if the value of the frame difference is greater than the threshold value, and the frame difference index having the logical value of "1, " is generated if the value of the frame difference is less than or equal to the threshold value. Moving index generator 313 generates a moving index representing whether the target moves or not, using the frame difference index of the current pixel and the frame difference indices of the pixels neighboring the current pixel. That is, when the frame difference index of the current pixel is "0" and the frame difference index of one or more of the 8 neighboring pixels is "0", moving index generator 313 generates the moving index representing that the target belongs to the moving region.

Figure 5:
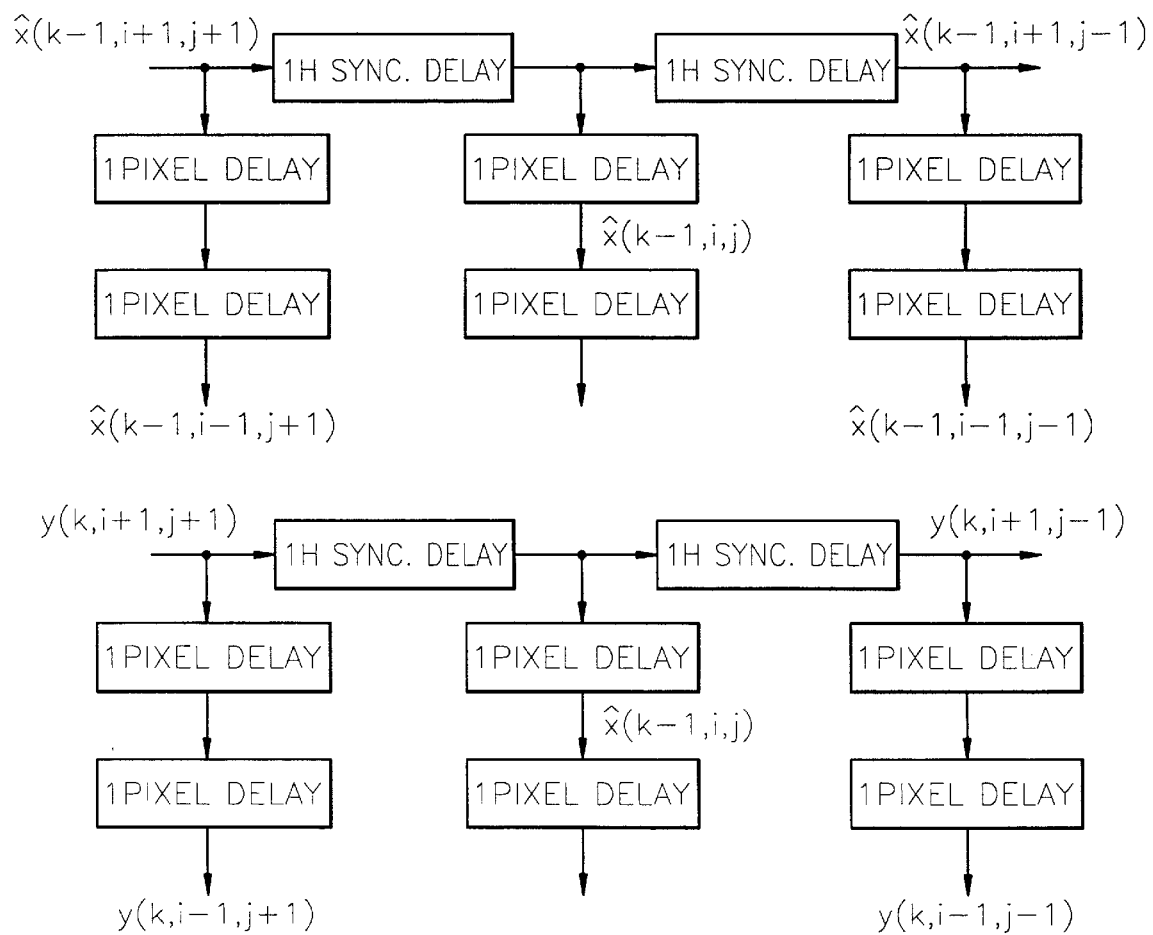
FIG. 5 is a diagram showing each delay element for generating a frame difference and moving index, and signals passed through the delay elements.

A logic for calculating the moving index MI(k,s) using the frame difference is as follows. First, in order to implement hardware, each delay element for generating the frame difference and the moving indices are shown in FIG. 5. If the two-dimensional location index "s" is expressed as (i,j) in the horizontal and vertical directions, respectively, delay in the horizontal direction by one is represented as "1 pixel clock" and delay in the vertical direction by one is represented as one horizontal synchronous period of time ("1H sync.").

The frame difference (FD) and the frame difference index (FDI) can be calculated by the delay elements of FIG. 5 according to the following equations (8) and (9).

$$FD(k,i,j)=|y(k,i,j)-x(k-1,i,j)| \quad (8)$$

If FD(k,i,j) is greater than $FD_{th}$, then FDI(k,i,j)=0, else FDI(k,i,j)=1 (9)

The $FD_{th}$ of the equation (9) represents a threshold value of the frame difference. It is theoretically equal to "0", however, it is set to a value between $\frac{1}{16} \sim \frac{1}{32}$ of the general quantization maximum value due to its sensitivity to the noise of the image signal. For example, for 8-bit quantization, the minimum bit value required for the human being to visually detect the change in the brightness of an independent pixel is 6, thus it is proper to set $FD_{th}$ to about 10. The frame difference index FDI may have the logical value "1" or "0" according to whether FD is greater than $FD_{th}$ or not. The above equations (8) and (9) are implemented easily using a generally well-known look-up table (LUT). The moving index (MI), determining whether the current pixel belongs to the non-moving region or the moving region, is obtained based on the obtained FDI, as shown in FIG. 6.

Figure 6:
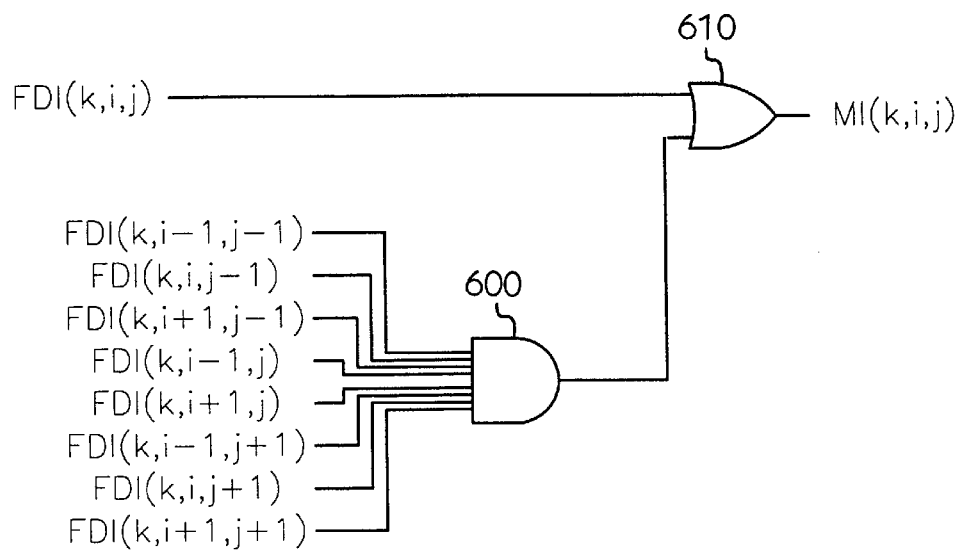
FIG. 6 is a diagram showing a moving index generator adopting an isolated pixel removing method according to 8 neighboring pixels.

In FIG. 6, FDI of the current pixel is expressed by FDI (k,i,j,). Here, the frame difference indices of 8 neighboring pixels are expressed by FDI (k,i−1, j−1), FDI (k,i,j−1), FDI (k, i+1, j−1). FDI (k, i−1, j), FDI (k,i+1,j), FDI (k,i,j+1), FDI (k,i,j), FDI (k,i+1,j+1). Here the frame difference indices of 8 neighboring pixels are used to determine the moving index MI (k,i,j) of the current pixel.

As shown in FIG. 6, the 8 neighboring pixels are input to an AND gate 600 and the result output from AND gate 600 is input to an OR gate 610. As can be seen from FIG. 6, when the FDI of the current pixel is "0" and FDI of one or more pixels of the 8 neighboring pixels is "0", the final MI is "0". That is, if relatively greater noise occurs at a pixel, it is determined whether the pixel with noise is isolated or not based on the FDIs of the pixel and its neighboring pixels. If the pixel with noise is isolated, the pixel is removed from the moving region of the moving target. This is for filtering an isolated pixel, caused by an impulsive noise which is frequently observed in the image signal, since the impulsive noise has a relatively high value of the frame difference. Also, the moving target should have a continuous boundary between two or more pixels at minimum. The above hardware having comparatively simple structure can achieve a real-time process.

Figure 7:
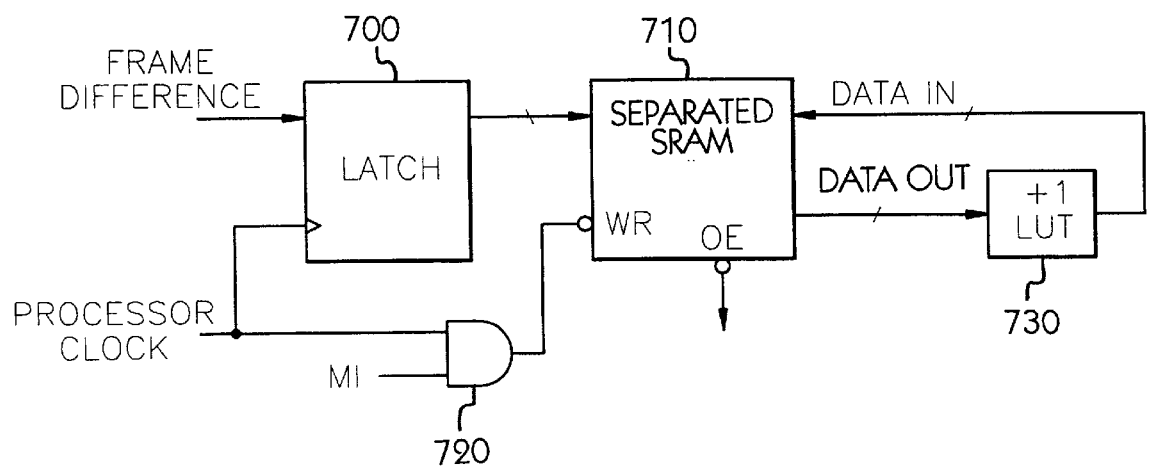
FIG. 7 is a block diagram showing an example of the internal logic of a histogram generator.

Histogram generator 320 is a generally well-known cumulative distribution circuit. Histogram generator 320 receives the frame difference FD(k,s) and the moving index MI(k,s) of frame difference generating portion 310 to convert the frame difference of the non-moving region into an cumulative distribution function required for calculating the variance $\sigma_w^2$ of the noise of the non-moving region of the observed signal, using the number of the accumulated pixels to represent the area of the non-moving region. Also, whether to accumulate the histogram is determined by the moving index, so that the variance of the observed noise signal is obtained easily by calculating the number of accumulated pixels and the sum of brightness of the accumulated pixels from the final accumulated value. FIG. 7 is a block diagram of an example of the internal logic of histogram generator 320.

In FIG. 7, the histogram generator 320 includes a latch 700 for latching the frame difference being synchronized with a processor clock; an AND gate 720 for performing an AND operation in response to the processor clock and the motion index MI; a separated SRAM 710 for storing a DATA IN signal by using the output from AND gate 720 as a write control signal and the latched signal output from latch 700 as an address signal; and a look-up table (LUT) 730 for increasing an input data DATA IN by one "1" in response to the output data from separated SRAM 710.

On the other hand, according to the moving index output from frame difference generating portion 310, a selective filter output circuit 330 outputs the observed signal unaltered when the current observed signal belongs to the moving region, and outputs the observed signal filtered by an adaptive filter having the gain calculated based on the variance $\sigma_w^2$ of the observation noise, calculated using the output data of histogram generator 320, when the current pixel belongs to the non-moving region. The selective filter output means 330 includes a first multiplexer 331, a second multiplexer 332, a first multiplier 333, a second multiplier 334 and an adder 335.

Multiplexer 331 outputs "1" as the gain when the moving index output from frame difference generator 310 represents the moving region, and outputs an adaptive filter gain bm(k) calculated using the variance of the observation noise, calculated based on the output data of histogram generator 320 when the moving index output from frame difference generator 310 represents the non-moving region. Multiplexer 332 outputs "0" when the moving index of frame difference generating portion 310 represents the moving region, and outputs 1−bm(k) when the moving index represents the non-moving region. Multiplier 333 multiplies the observed signal y(k,s) by the output of multiplexer 331. Multiplier 332 multiplies the output signal of frame memory 331 by the output value of multiplexer 332. Adder 335 sums the output values of multiplier 333 and multiplier 334.

As described above, according to the modified first-order automatic regressive filter of the present invention in which the observed signal of the moving region is output unaltered while the signal of the non-moving region is output via an adaptive filter, a continuous moving picture signal can be processed on a real-time basis, providing high performance noise removal. Also, the edge of the moving target of the moving picture can be preserved well.

What is claimed is:

1. A filtering method of a modified automatic regressive filter for removing a blurring phenomenon at the edge of a moving target, comprising the steps of:

generating a frame difference for each successive frame, caused by the difference between an observed signal and an output signal of the modified automatic regressive filter delayed by a frame;

classifying an original image signal into a moving region and a non-moving region according to whether the frame difference exists or not; and outputting the signal in the non-moving region passed via an adaptive filter and the signal in the moving region, having variations generated by the moving of the target, unaltered.

2. A filtering method as claimed in claim 1, wherein said classifying step is performed by an isolated pixel removing method according to 8 pixels neighboring a reference pixel.

3. A method for determining the variance of noise of a moving picture, comprising the steps of:

making a histogram utilizing a frame difference between two continuous frames of a non-moving region, the frame difference being generated by the difference between an observed signal and an output signal from a filter delayed by a frame; and calculating variance of observation noise using the histogram.

4. A modified automatic regressive filter for removing a blurring phenomenon at a moving target's edge using an adaptive filter, comprising:

a frame memory for storing one frame output from the modified automatic regressive filter to obtain a delayed frame;

a frame difference generating portion for receiving the delayed frame stored in the frame memory and an observed signal, to output a frame difference resulting from a difference between the delayed frame and the observed signal, and determining whether a current pixel belongs to a non-moving region or a moving region using the frame difference to output a moving index representing whether a target moves or not;

a histogram generator for receiving the frame difference and the moving index of the frame difference generating portion to convert the frame difference of the non-moving region into a cumulative distribution function required for calculating a variance of noise in the non-moving region of the observed signal, wherein the number of accumulated pixels represents the area of the non-moving region; and selective filter output means for selectively outputting the observed signal unaltered in the moving region and the signal passed via an adaptive filter having a gain calculated based on the variance of the observation noise obtained from the output data of the histogram generator in the non-moving region, depending on the moving index output from the frame difference generating portion.

5. A modified automatic regressive filter as claimed in claim 4, wherein said frame difference generating portion comprises:

a frame difference generator for receiving the delayed frame, stored in the frame memory, and the current observed signal to generate the frame difference based on the difference between the output signal from the filter delayed by a frame and the observed signal;

a frame difference index generator for comparing the value of the frame difference calculated from the frame difference generator with a predetermined threshold value to generate a frame difference index having a logical value of "0" or "1" according to the result of the comparison; and a moving index generator for generating the moving index representing whether a target belongs to the moving region or not, based on the frame difference index of the current pixel and frame difference indices of the pixels neighboring the current pixel.

6. A modified automatic regressive filter as claimed in claim 5, wherein the frame difference index generated from said frame difference index generator has the logical value "0" when the value of the frame difference is greater than the predetermined threshold value, and the logical value "1" when the value of the frame difference is less than the predetermined threshold value, and the moving index generator generates the moving index representing that the target belongs to a moving region when the frame difference index of the current pixel and one or more frame of the 8 neighboring pixels enclosing the current pixel are "0".

7. A modified automatic regressive filter as claimed in claim 4, wherein said selective filter output means comprises:

a first multiplexer for outputting "1" as the gain when the moving index of the frame difference generating portion represents the moving region, and outputting a gain "bm(k)" of the adaptive filter, calculated based on the variance of the observation noise, obtained using the output data of the histogram generator, when the moving index represents the nonmoving region;

a second multiplexer for outputting "0" when the moving index of the frame difference generating portion represents the moving region, and "1−bm(k)" when the moving index represents the non-moving region;

a first multiplier for multiplying the observed signal by the output value of the first multiplexer;

a second multiplier for multiplying the output signal of the frame memory by the output value of the second multiplexer; and an adder for summing the output value of the first multiplier and the output value of the second multiplier.

\* \* \* \* \*